(12) United States Patent
Long et al.

(10) Patent No.: US 12,454,097 B2
(45) Date of Patent: Oct. 28, 2025

(54) THREE-DIMENSIONAL PRINTING WITH POLYAMIDES AND CUBIC LATTICE STRUCTURED PARTICLES

(71) Applicant: PERIDOT PRINT LLC, Palo Alto, CA (US)

(72) Inventors: Greg Scott Long, Corvallis, OR (US); Emily Levin, San Diego, CA (US); Emre Hiro Discekici, San Diego, CA (US); Shannon Reuben Woodruff, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 43 days.

(21) Appl. No.: 18/689,061

(22) PCT Filed: Sep. 29, 2021

(86) PCT No.: PCT/US2021/052532
§ 371 (c)(1),
(2) Date: Mar. 4, 2024

(87) PCT Pub. No.: WO2023/055349
PCT Pub. Date: Apr. 6, 2023

(65) Prior Publication Data
US 2024/0278488 A1    Aug. 22, 2024

(51) Int. Cl.
| B29C 64/165 | (2017.01) |
| B29K 77/00 | (2006.01) |
| B29K 105/16 | (2006.01) |
| B29K 507/04 | (2006.01) |
| B29K 509/04 | (2006.01) |
| B33Y 10/00 | (2015.01) |

(Continued)

(52) U.S. Cl.
CPC ............ *B29C 64/165* (2017.08); *B33Y 70/00* (2014.12); *B29K 2077/00* (2013.01); *B29K 2105/16* (2013.01); *B29K 2507/045* (2013.01); *B29K 2509/04* (2013.01); *B29K 2995/0013* (2013.01); *B33Y 10/00* (2014.12); *B33Y 30/00* (2014.12)

(58) Field of Classification Search
CPC ....... B29C 64/165; B33Y 70/00; B33Y 10/00; B33Y 30/00; B33Y 70/10; B29K 2077/00; B29K 2105/16; B29K 2507/045; B29K 2509/04; B29K 2995/0013
See application file for complete search history.

(56) References Cited

U.S. PATENT DOCUMENTS

| 10,519,356 B2 | 12/2019 | Chua et al. |
| 2013/0207029 A1 | 8/2013 | Janssen et al. |

(Continued)

FOREIGN PATENT DOCUMENTS

| CA | 3127612 A1 * | 8/2020 | ............. F16B 37/14 |
| WO | 2019/063151 A1 | 4/2019 | |

(Continued)

*Primary Examiner* — Nahida Sultana
(74) *Attorney, Agent, or Firm* — Dierker & Kavanaugh, P.C.

(57) ABSTRACT

A particulate build material for three-dimensional printing can include from about 80 wt % to about 99.5 wt % of a polyamide particles, and from about 0.5 w % to about 7.5 wt % of thermally conductive particles including cubic lattice structured particles of carbon, cubic lattice structured particles of boron and nitrogen, or a combination thereof.

15 Claims, 4 Drawing Sheets

(51) Int. Cl.
  *B33Y 30/00* (2015.01)
  *B33Y 70/00* (2020.01)

(56) References Cited

U.S. PATENT DOCUMENTS

2018/0318922 A1  11/2018  Isaac
2019/0248067 A1   8/2019  Achten et al.
2021/0179868 A1   6/2021  Peterson et al.

FOREIGN PATENT DOCUMENTS

WO   2019/199328 A1   10/2019
WO   2020/064756 A1    4/2020
WO   2021/076109 A1    4/2021

* cited by examiner

THREE-DIMENSIONAL PRINTING WITH POLYAMIDES AND CUBIC LATTICE STRUCTURED PARTICLES

BACKGROUND

Methods of three-dimensional (3D) digital printing, a type of additive manufacturing, have continued to be developed over the last few decades. However, systems for three-dimensional printing have historically been very expensive, though those expenses have been coming down to more affordable levels recently. In general, three-dimensional printing technology can shorten the product development cycle by allowing rapid creation of prototype models for reviewing and testing. In some respects, three-dimensional printing has been somewhat limited with respect to commercial production capabilities because the range of materials used in three-dimensional printing is likewise limited. Nevertheless, several commercial sectors such as aviation and the medical industry have benefitted from the ability to rapidly prototype and customize parts for customers.

DETAILED DESCRIPTION

The present disclosure relates to particulate build materials, three-dimensional printing kits or systems, and methods that can be used for three-dimensional printing. Three-dimensional (3D) printing processes, such as polyamide-based multi-jet fusion (MJF) printing, can be used to produce three-dimensional objects. The three-dimensional printed object may have thermal properties related to particulate build material choice, but in accordance with the present disclosure, those thermal properties can be modified though the use of an additive or additives to decrease the heat capacity, decrease the melt and crystallization enthalpies, and/or increase the thermal conductivity of materials used to prepare the three-dimensional objects. When the additive(s) is included at relatively modest weight ratios relative to the polyamide particles of the build material, e.g., from about 0.5 wt % to about 7.5 wt % additive relative to from about 80 wt % to about 99.5 wt % polyamide particle, these thermal properties can be modified without appreciable impact on mechanical properties in many examples.

Particulate Build Materials

Figure 1:
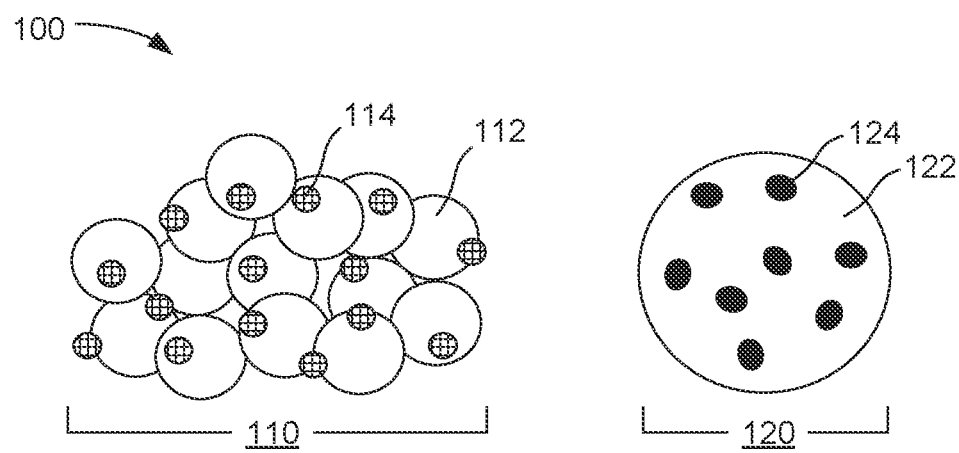
FIG. 1 is a schematic view of an example particulate build material and three-dimensional printing kit in accordance with the present disclosure.

In accordance with the present disclosure and as shown by way of example in FIG. 1, three-dimensional printing kits 100 include a particulate build material 110 and a fusing agent 120 for three-dimensional printing. The particulate build material in this example includes from about 80 wt % to about 99.5 wt %, from about 90 wt % to about 99.5 wt %, or from about 95 wt % to about 99.5 wt % polyamide particles 112; and from about 0.5 w % to about 7.5 wt %, from about 1 w % to about 7 wt %, or from about 2 wt % to about 6 wt % thermally conductive particles 114. The thermally conductive particles include cubic lattice structure particles of carbon, a cubic lattice structured particles of boron and nitrogen, or a combination thereof. In some examples, the polyamide particles of the particulate build material can become heat fused together at locations where fusing agent is applied and corresponding electromagnetic energy is used to energize an electromagnetic radiation absorber present in the fusing agent, thus forming a thermally fused three-dimensional object. Furthermore, in examples herein, the thermally conductive particles can become entrapped or composited into the three-dimensional part matrix with the polymer, which can enhance stiffness of the three-dimensional printed object.

The cubic lattice structured particles of carbon can be in the form of diamond-like carbon (DLC) or diamond particles, and the cubic lattice structured particles of boron and nitrogen can be in the form of cubic boron nitride (c-BN) or amorphous boron nitride (a-BN), as all of these compositions can include a partial or fully cubic lattice structure.

Diamond particles, for example, include a tetrahedral structure that is very uniform and rigid. There may be some impurities with the diamond structure, but the structure is primarily cubic and crystalline, and more particularly, the structure is referred to as a sphalerite crystal structure.

Diamond-like carbon (DLC) also includes some of the cubic structure of diamond, though in more of a hybrid form. DLC is a class of amorphous carbon material that is typically a structural hybrid of $sp^3$ and $sp^2$ bonded material, though it can include purely $sp^3$ bonded carbon in its purest and strongest form, e.g., ta-C. It can be considered amorphous because it has no long-range crystalline order. Examples of DLC that is not has hard or pure as ta-C type DLC may include from about 70 at % to about 99 at % $sp^3$ carbon and about 1 atomic percent (at %) to about 30 at % $sp^2$ carbon (or graphitic carbon) (for thermal tests). Atomic percent provides the percentage of one kind of atom relative to a total number of atoms of the material.

Cubic boron nitride (c-BN) has crystal structure analogous to that of diamond, e.g., a sphalerite crystal structure, the same as that of diamond, and is also called β-BN or c-BN. Instead of having carbon atoms bonded together essentially throughout, boron and nitrogen atoms are bonded together in an alternating manner, simulating the structure of diamond. Similar to diamond particles, c-BN particles exhibit high thermal conductivity and electrical resistivity. In some examples, c-BN particles can be produced by sintering or annealing c-BN powders in nitrogen flow at temperatures slightly below the boron nitride decomposition temperature.

Amorphous boron nitride (a-BN) can also include a hybridized portion of a cubic lattice structure as well. For example, using thermal chemical vapor deposition at high temperatures, c-BN can be deposited as part of amorphous boron nitride, giving the a-BN a partially cubic lattice structure as well.

The thermally conductive particles 114, as mentioned, can include a cubic lattice structure of carbon (diamond and/or DLC), a cubic lattice structure of boron and nitrogen (c-BN and/or a-BN), or a combination thereof, as described previously. The thermally conductive particles can have an aspect ratio of about 1:1 to about 2:1 or about 1:1 to about 1:1.5, and can have a D50 particle size from about 30 nm to about 10 μm, from about 100 nm to about 5 μm, from about 300 nm to about 3 μm, or from about 500 nm to about 2 μm.

The polyamide particles 112 included in the particulate build material can have an aspect ratio of about 1:1 to about 2:1 or about 1:1 to about 1.5:1, and can have a D50 particle size from about 5 μm to about 150 μm, from about 10 μm to about 125 μm, or from about 20 μm to about 100 μm, for example. In some examples, the thermally conductive particles can be smaller in particle size relative to the polyamide particles. In some examples, the thermally conductive particles can be less than about half the size of the polyamide particles based on their respective D50 particle sizes, or even an order of magnitude smaller (or more than an order of magnitude smaller) than the polyamide particles based on D50 particles sizes. For example, particulate build material including polyamide particles having a D50 particle size of about 50 μm may include thermally conductive particles having a D50 particle size less than about 25 μm, or less than about 5 μm.

"D50" particle sizes are based on the equivalent spherical volume of the particles described, e.g., polyamide particles, thermally conductive particles, radiation absorber particles (in the fusing agent), etc. D50 particle sizes can be measured by laser diffraction, scanning electron microscope (SEM) imaging, or other suitable methodology, but in some examples, the particle size (or particle size distribution) can be measured and/or characterized using a Malvern™ Mastersizer™ 3000 available from Malvern Panalytical (United Kingdom). The particle size analyzer measures particle size using laser diffraction as a laser beam passes through a sample of particles. The angular variation in intensity of light scattered by the particles can then be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent spherical diameter when the particles are not spherical, e.g., having about a 1:1 aspect ratio.

In further detail regarding the polyamide particles 112, these particles can have a melting point temperature from about 100° C. to about 350° C. In other examples, the polyamide particles can have a melting point from about 125° C. to about 250° C., from about 150° C. to about 225° C., or from about 175° C. to about 200° C. Examples of polyamide particles that can be used include polyamide-6, polyamide-8, polyamide-10, polyamide-11, polyamide-12, polyamide-6,6, polyamide 6,10, polyamide-6,12, polyamide copolymer, or a combination thereof. In other examples, the polyamide particles can be or include polyamide-11 particles and/or polyamide-12 particles. The polyamide-11 and/or polyamide-12 can have an average melting point from about 175° C. to about 200° C. for example.

In some examples, the polyamide particles may be rigid polyamide particles, e.g., polyamide particles other than thermoplastic polyamide elastomer (TPA). Rigid polyamide particles can be defined as having a Young's Modulus from about 500 MPa to about 3,500 MPa or from about 800 MPa to about 2,000 MPa, for example. Young's Modulus can be measured by forming or shaping a three dimensional object in the shape of a "Type 5" dog bone and conducting mechanical property testing for Young's Modulus in accordance with ASTM D638. For example, the dog bones can be gripped at the two end portions of the dog bone objects to provide stress or force in relation to the pulling apart of the two ends and stressing the middle portion (using an Instron tensiometer with a pull rate of 500 mm per minute).

For additional clarity and in accordance with examples herein, the term "particulate build material" 110 refers to the particulate composition formulation blend that can be applied to a build platform or a powder bed for three-dimensional printing. The particulate build material is used to make up the bulk of the printed object, and in accordance with the present disclosure, includes two types of particles: polyamide particles 112 and thermally conductive particles 114. In still further detail, the particulate build material includes other additives, but in one example, may consist or consist essentially of the polyamide particles and the thermally conductive particles. If other additives are included, examples of materials usable may include filler, such as alumina, silica, fibers, carbon nanotubes, cellulose, free-flow compound, anti-caking compound, or a combination thereof. The filler particles can likewise become embedded in the polymer of the completed three-dimensional object, forming a composite material. Free-flow compound and/or anti-caking compound can prevent or reduce packing of the powder particles, coat the powder particles and smooth edges to reduce inter-particle friction, and/or absorb moisture. If filler is included, it may be included in the particulate build material at from about 0.1 wt % to about 15 wt %, or from about 1 wt % to about 10 wt %, for example.

In some examples, the particulate build material 110 can include polyamide particles 112 having a variety of shapes, such as substantially spherical particles or irregularly-shaped particles. Since the polyamide particles may typically be some of the larger particles in the particulate build material, e.g., D50 from about 5 μm to about 150 μm, from about 20 μm to about 150 μm, from about 20 μm to about 50 μm, from about 30 μm to about 100 μm, etc., the resolution of these particles can be used to establish the resolution of the three-dimensional object. The term "resolution" refers to the size of the smallest feature that can be formed on a three-dimensional printed object. As an example, the particulate build material can be used to form layers from about 10 μm to about 200 μm thick (or more), depending on the D50 particle size of the polyamide particles, allowing the fused layers of the printed part to have roughly the same thickness, or in some examples, different thicknesses. This can provide a resolution in the z-axis direction (corresponding to build layer depth) of about 10 μm to about 200 μm, but more typically from about 20 μm to about 150 μm. The particulate build material can also have a sufficiently small particle size and sufficiently regular particle shape to provide from about 5 μm to about 150 μm resolution along the x-axis and y-axis (corresponding to the two axes parallel to the top surface of the powder bed).

Three-Dimensional Printing Systems

Referring now more specifically to the three-dimensional printing kits 100 shown in FIG. 1, these kits can be included as part of a three-dimensional printing system. The three-dimensional printing kits, for example, include the particulate build material 110 (described above in detail) and a fusing agent 120. The fusing agent in this example includes water 122 and a radiation 10) absorber 124 to absorb radiant electromagnetic energy and convert the energy to heat. Thus, the "radiation absorber" in examples of the present disclosure can be an electromagnetic radiation absorber, such as an IR or UV radiation absorber, as this material can absorb radiant electromagnetic energy and convert that energy into heat at the site of application onto the particulate build material. For example, a thin layer of particulate build material can be applied to a powder bed, and then the fusing agent can be selectively applied to areas of the particulate build material that are desired to be consolidated to become part of the solid three-dimensional printed object. The fusing agent can be applied, for example, by printing or ejection from a fluid ejector or fluid jet printhead. Fluid jet printheads can jet the fusing agent in a similar way to an inkjet printhead jetting ink. Accordingly, the fusing agent can be applied with precision to certain areas of the particulate build material that are desired to form a layer of the final three-dimensional printed object. After applying the fusing agent, the particulate build material can be irradiated with radiant energy. The radiation absorber from the fusing agent can absorb this energy and convert it to heat, thereby heating any polyamide particles in contact with the radiation absorber. An appropriate amount of radiant energy can be applied so that the area of the particulate build material that was printed with the fusing agent heats up enough to melt the polyamide particles to consolidate the particles into a solid layer, while the particulate build material that was not printed with the fusing agent remains as a loose powder with separate particles.

In some examples, the amount of radiant energy applied, the amount of fusing agent applied to the powder bed, the concentration of radiation absorber in the fusing agent, and the preheating temperature of the powder bed (the temperature of the particulate build material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the three-dimensional printing system. Generally, the print mode can include any variables or parameters that can be controlled during three-dimensional printing to affect the outcome of the three-dimensional printing process.

Generally, the process of forming a single layer by applying a fusing agent and irradiating the powder bed can be repeated with additional layers of particulate build material to form additional layers of the three-dimensional printed object, thereby building up the final object one layer at a time. In this process, the particulate build material surrounding the three-dimensional printed object can act as a support material for the object. When the three-dimensional printing is complete, the object can be removed from the powder bed and any loose powder on the object can be removed.

As mentioned, the fusing agent can include a radiation absorber that is capable of absorbing electromagnetic radiation to produce heat. The radiation absorber can be colored or colorless. Example radiation absorbers include carbon black pigment, glass fiber, titanium dioxide, clay, mica, talc, barium sulfate, calcium carbonate, metal dithiolene complex, near-infrared absorbing dye, near-infrared absorbing pigment, metal nanoparticles, conjugated polymer, or a combination thereof. Examples of near-infrared absorbing dyes include aminium dyes, tetraaryldiamine dyes, cyanine dyes, pthalocyanine dyes, dithiolene dyes, and others. In further examples, the radiation absorber can be a conjugated polymer (or near-infrared conjugated polymer) such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

Likewise, a variety of near-infrared absorbing pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments. Additional near-infrared absorbing pigments can include silicates. Silicates can have the same or similar counterions as phosphates. One non-limiting example can include $M_2SiO_4$, $M_2Si_2O_6$, and other silicates where M is a counterion having an oxidation state of $+_2$. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

The radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planar complexes. Non-limiting specific examples include complexes based on nickel, palladium, and platinum.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctyl-phenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the particulate build material, the amount of radiation absorber in the particulate build material can be from about 0.0003 wt % to about 10 wt %, or from about 0.005 wt % to about 5 wt %, with respect to the weight of the particulate build material.

In some examples, the fusing agent can be jetted or ejected onto the particulate build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In addition to the water 122, the water can be formulated with other liquids as a liquid vehicle formulation, which may include organic co-solvent present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can include other vehicle components such as biocides, viscosity modifiers, materials for pH adjustment, sequestering agents (e.g., chelators), preservatives, or the like. In one example, the liquid vehicle can be predominantly water, e.g., 50 wt % or more.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol, or 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, Nuosept™ (Nudex, Inc., New Jersey), Ucarcide™ (Union carbide Corp., Texas), Vancide™ (R.T. Vanderbilt Co., Connecticut), Proxel™ (ICI Americas, New Jersey), and combinations thereof. Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

In some examples, the three-dimensional printing kits 100 can further include a detailing agent (not shown). The detailing agent can include a detailing compound that is applied to the particulate build material at boundary areas surrounding the three-dimensional object being printed to reduce the temperature of the particulate build material onto which the detailing agent is applied. By reducing the temperature at these locations, often a sharper or cleaner boundary can be generated that defines the three-dimensional object. There are other locations that the detailing agent can be applied for purposes of cooling as well. Furthermore, the detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polyamide particles. Depending on the type of polyamide particles used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Figure 2:
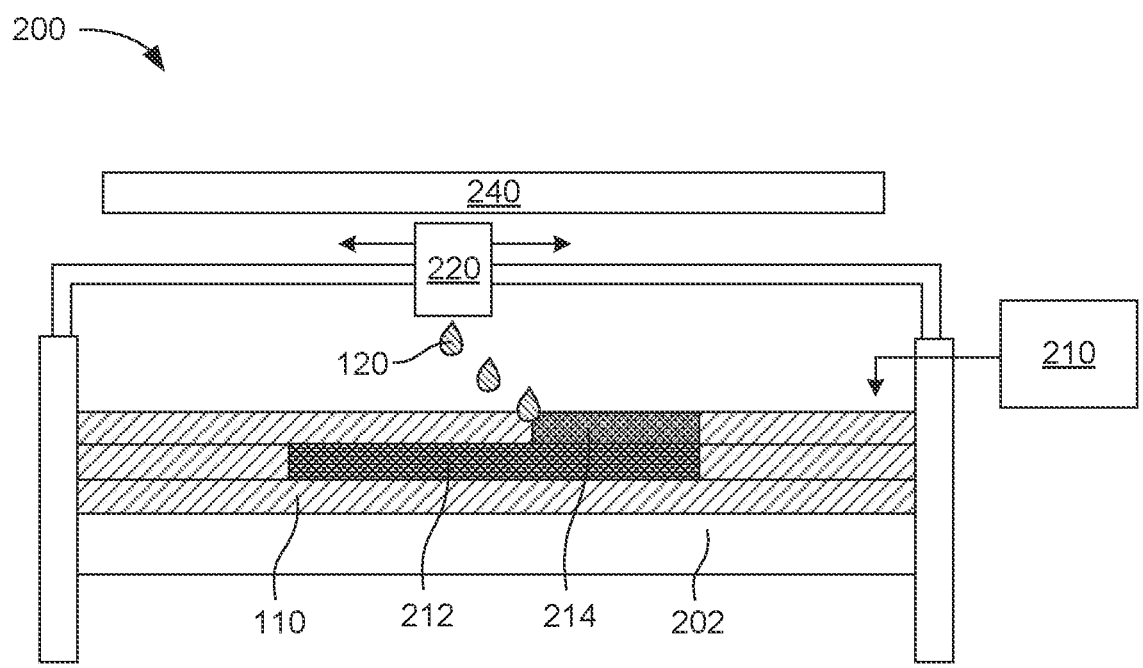
FIG. 2 is a schematic view of an example system for three-dimensional printing in accordance with the present disclosure.

In FIG. 2, an example of a three-dimensional printing system 200 is shown, which includes the three-dimensional printing kit 100 of FIG. 1. The three-dimensional printing kit is shown in FIG. 2 as the particulate build material 110 and the fusing agent 120. In the example shown, the system includes a build platform 202 where the particulate build material can be deposited using a particulate build material applicator 210 to form a powder bed of the particulate build material. When applied to the powder bed, the particulate build material can be flattened or smoothed, such as by a mechanical roller or other flattening technique, for example. The fusing agent can then be applied to an upper layer 214 using a fluid ejector 220, wherein upon application of radiation or electromagnetic energy from a radiation source 240, the upper layer with fusing agent applied can become fused together and fused to the previously applied layer of the three-dimensional object. A detailing agent and/or other fluid agent, e.g., a coloring agent, can likewise be used in some examples (not shown). The upper layer where the fusing agent can be applied corresponds to a layer or slice of a three-dimensional object.

In this particular example, the radiant energy source 240 can irradiate the entire powder bed at once, though in other examples, the radiant energy source can be movable (as shown hereinafter at FIGS. 4A-4C). The radiant energy source can heat the particulate build material 110 and fusing agent 120 until the particulate build material on which the fusing agent was printed reaches a melting or softening point temperature of the polyamide particles in the particulate build material. The polyamide particles can fuse together to form a solid polymer matrix upon application of the electromagnetic energy from the radiant energy source. In this figure, one layer of solid polymer matrix 212 has already been formed and then a layer of additional particulate build material has been spread over the top of the solid layer. The figure shows the fusing agent being applied to the additional layer 214, which can then subsequently be heated and fused to add another solid layer to the three-dimensional printed object.

In further examples, the system can include a heater positioned along a side(s) of the particulate build material, beneath the particulate build material, or a combination of these locations (not shown). For example, in some instances, the support bed can include an additional integrated heater to heat the particulate build material from below to maintain a more uniform temperature in the powder bed. For example, the powder bed can be preheated to a temperature below the melting or softening point of the polyamide particles. In one example, the preheat temperature can be from about 10° C. to about 30° C. below the melting or softening point. In another example, the preheat temperature can be within 50° C. of the melting or softening point. In a particular example, the preheat temperature can be from about 150° C. to about 170° C. and the polyamide particles can include polyamide-12 polymer. In another example, the preheat temperature can be from about 160° C. to about 180° C. and the polyamide particles can be polyamide-11. Preheating can be accomplished with a lamp or lamps, an oven, a heated support bed, or other types of heaters. In some examples, the entire powder bed can be heated to a substantially uniform temperature. Preheating is not to fuse the particulate build material, but to bring the particulate build material to a temperature with a relatively small temperature boost provided by application of the fusing agent and the electromagnetic radiation bringing the temperature in print selected areas into softening temperatures and/or melting temperatures for fusion.

The radiant energy source 240 can be used to preheat the areas of the powder bed where fusing agent has been applied to fuse the polymer particles in those areas. In certain examples, the radiant energy source heater can include a heat lamp, infrared heater, halogen lamp, fluorescent lamp, or other type of radiant energy source. In further examples, the radiant energy source can be mounted on a carriage to move across the powder bed. In certain examples, the fusing agent ejector and the radiant energy source can both be mounted on a carriage to move across the powder bed. For example, the fusing agent can be jetted from the fusing agent ejector on a forward pass of the carriage, and the radiant energy source can be activated to irradiate the powder bed on a return pass of the carriage. Additional ejectors may also be included to eject other fluid, as may be indicated for a specific application. For example, the lamp can be mounted on a track to move horizontally across the powder bed. Such a fusing lamp can make multiple passes over the bed depending on the amount of exposure to coalesce individual printed layers together and to one another. In one example, the fusing lamp can irradiate the entire powder bed with a substantially uniform amount of energy, and in other examples, can be more targeted to a region of the powder bed. Either way, where the radiation energy is applied, this can selectively coalesce the printed portions with fusing agent leaving the unprinted portions of the particulate build material below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polyamide particles with the fusing agent printed thereon, while the unprinted polyamide particles do not absorb as much light and remain at a lower temperature.

Depending on the amount of radiation absorber present in the particulate build material, the absorbance of the radiation absorber, the preheat temperature, and the melting or softening point of the polymer, an appropriate amount of irradiation can be supplied from the fusing lamp. In some examples, the fusing lamp can irradiate individual layers from about 0.5 to about 10 seconds per pass.

Methods of Three-Dimensional Printing

Figure 3:
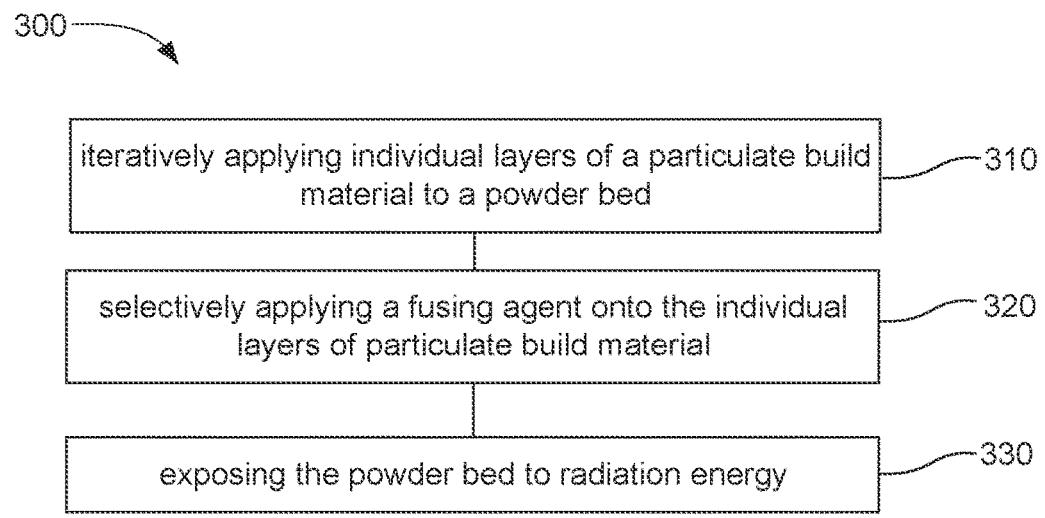
FIG. 3 is a flowchart illustrating an example method of making a three-dimensional printed object in accordance with examples of the present disclosure.

Methods of printing a three-dimensional object can be carried out using the three-dimensional printing kits and/or systems of the present disclosure. As shown in FIG. 3, a method 300 of printing a three-dimensional object includes iteratively applying 310 individual layers of a particulate build material to a powder bed, wherein the particulate build material comprises from about 80 wt % to about 99.5 wt % of polyamide particles and from about 0.5 wt % to about 7.5 wt % of thermally conductive particles including cubic lattice structured particles of carbon, cubic lattice structured particles of boron and nitrogen, or a combination thereof. Furthermore, based on a three-dimensional object model, the method includes selectively applying 320 a fusing agent onto the individual layers of particulate build material, wherein the fusing agent comprises water and a radiation absorber, wherein the radiation absorber absorbs radiation energy and converts the radiation energy to heat. Additionally, the method includes exposing 330 the powder bed to radiation energy to selectively fuse the polyamide particles in contact with the radiation absorber at individual layers to iteratively form the three-dimensional object with the thermally conductive particles dispersed therein.

In one example, the thermally conductive particles can include cubic boron nitride particles, diamond particles, diamond-like carbon particles, or a combination thereof. The thermally conductive particles can have an aspect ratio of about 1:1 to about 2:1 and a D50 particle size from about 30 nm to about 10 µm, or any of the subranges of aspect ratio and/or particle sizes described herein. In some examples, the particulate build material can include other additives, or can consist of or consist essentially of the polyamide particles and the thermally conductive particles.

Figure 4A:
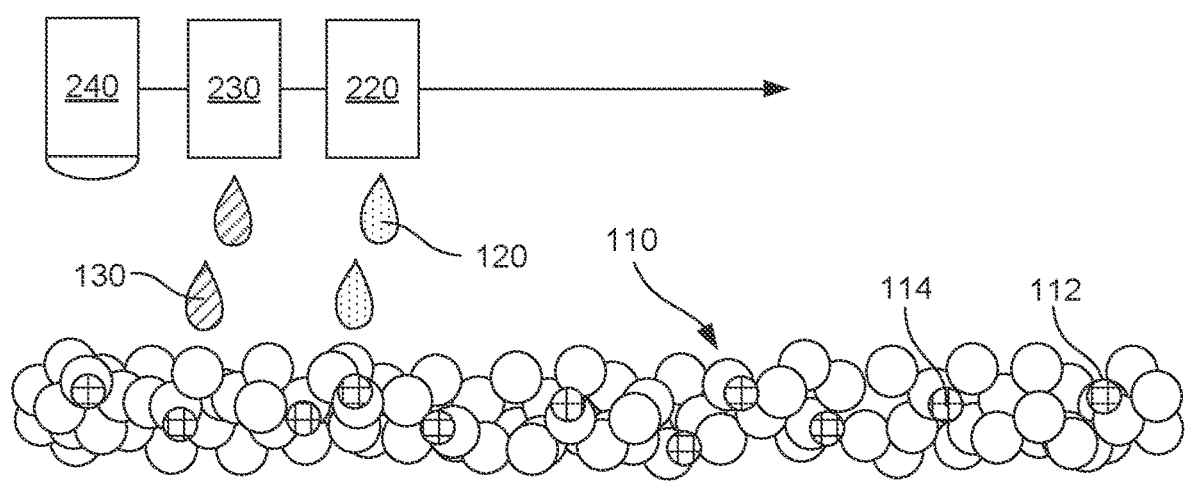
FIGS. 4A-4C schematically depict an example three-dimensional printing system and method in accordance with the present disclosure.
Figure 4B:
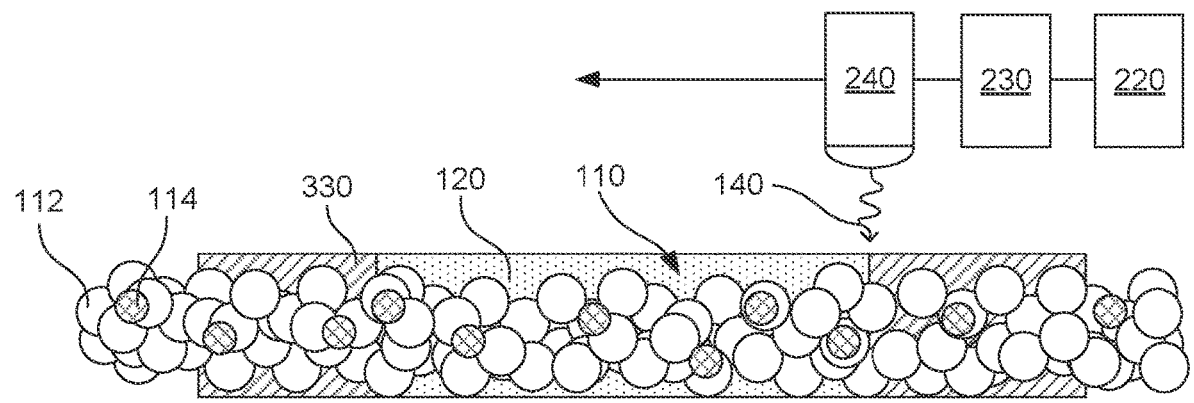
Figure 4C:
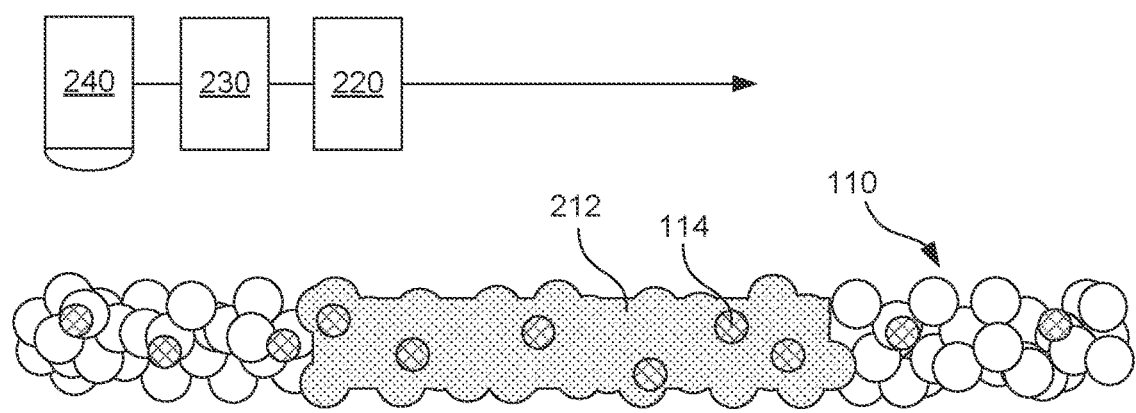

In further detail regarding the three-dimensional printing kits, systems, and methods described herein, FIGS. 4A-4C illustrate a three-dimensional printing process that can be carried out using a three-dimensional printing system in accordance with the present disclosure. In FIG. 4A, a fusing agent 120 is jetted onto a layer of particulate build material 110 made up of polyamide particles 112 and thermally conductive particles 114 mixed with the polyamide particles. The fusing agent 120 is jetted from a fusing agent ejector 220. In one example, and as shown in this FIG., a detailing agent 130 may also be used which can be jetted from a detailing agent ejector 230. These fluid ejectors can move across the layer of particulate build material to selectively jet fusing agent on areas that are to be fused, while the detailing agent (if used) can be jetted onto areas that are to be cooled. In some cases, the detailing agent can be jetted around edges of the area where the fusing agent was jetted to prevent the surrounding particulate build material from caking. In other examples, the detailing agent can be jetted onto a portion of the same area where the fusing agent was jetted to prevent overheating of the particulate build material. A radiation source 240 can also move across the layer of particulate build material. Alternatively, the radiation source can be a fixed position (as shown in FIG. 2) source that irradiates the particulate build material on a layer-by-layer basis.

FIG. 4B shows the layer of particulate build material 110 after the fusing agent 120 has been jetted onto an area of the layer that is to be fused. Additionally, in this example, the detailing agent 130 has been jetted onto areas of the powder bed adjacent to edges of the area where the fusing agent was jetted. In this figure, the radiation source 140 is shown emitting radiation 140 toward the layer of particulate build material which includes polyamide particles 112 and calcium carbonate particles 114. The fusing agent can include a radiation absorber that can absorb this radiation and convert the radiation energy to heat, as previously described.

FIG. 4C shows the layer of particulate build material 110 with a fused portion 212 where the fusing agent was jetted. This portion has reached a sufficient temperature to fuse the polyamide particles together to form a solid polymer matrix. The fused portion has thermally conductive particles 114 trapped within the polymer matrix, which can modify the thermal properties of the particulate build material during printing as well as modify the thermal properties of the three-dimensional object that is formed. The area where the detailing agent was jetted remains as loose powder. In this example, the detailing agent evaporates to evaporatively cool the polyamide particles, which can help produce a well-defined edge of the fused layer by reducing partially fused or caked powder particles around the edges.

The three-dimensional printed object can be formed by jetting or ejecting the fusing agent onto layers of particulate build material according to a three-dimensional object model. Three-dimensional object models can in some examples be created using computer aided design (CAD) software. Three-dimensional object models can be stored in any suitable file format. In some examples, a three-dimensional printed object as described herein can be based on a single three-dimensional object model. In certain examples, the three-dimensional object model can define the three-dimensional shape of the object and the three-dimensional shape of areas of the powder bed to be jetted with the detailing agent. In other examples, the object can be defined by a first three-dimensional object model and a second three-dimensional object model can define areas to jet the detailing agent. In further examples, the jetting of the detailing agent may not be controlled using a three-dimensional object model, but by using some other parameters or instructions to the three-dimensional printing system. Other information may also be included in three-dimensional object models, such as structures to be formed of additional different materials or color data for printing the object with various colors at different locations on the object. The three-dimensional object model may also include features or materials specifically related to jetting fluids on layers of particulate build material, such as the desired amount of fluid to be applied to a given area. This information may be in the form of a droplet saturation, for example, which can instruct a three-dimensional printing system to jet a certain number of droplets of fluid into a specific area. This can allow the three-dimensional printing system to finely control radiation absorption, cooling, color saturation, and so on. All this information can be contained in a single three-dimensional object file or a combination of multiple files. The three-dimensional printed object can be made based on the three-dimensional object model. As used herein, "based on the three-dimensional object model" can refer to printing using a single three-dimensional object model file or a combination of multiple three-dimensional object models that together define the object. In certain examples, software can be used to convert a three-dimensional object model to instructions for a three-dimensional printer to form the object by building up individual layers of particulate build material.

In an example of the three-dimensional printing process, a thin layer of particulate build material can be spread on a bed to form a powder bed. At the beginning of the process, the powder bed can be empty because no polyamide particles have been spread at that point. For the first layer, the polyamide particles can be spread onto an empty build platform. The build platform can be a flat surface made of a material sufficient to withstand the heating conditions of the three-dimensional printing process, such as a metal. Thus, "applying individual particulate build material layers of polyamide particles to a powder bed" includes spreading polyamide particles onto the empty build platform for the first layer. In other examples, a number of initial layers of particulate build material can be spread before the printing begins. These "blank" layers of particulate build material can in some examples number from about 10 to about 500, from about 10 to about 200, or from about 10 to about 100. In some cases, spreading multiple layers of powder before beginning the print can increase temperature uniformity of the three-dimensional printed object. A fluid jet printing head, such as an inkjet print head, can then be used to print a fusing agent including a radiation absorber over portions of the powder bed corresponding to a thin layer of the three-dimensional object to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of particulate build material can be spread over the powder bed and the process can be repeated to form additional layers until a complete three-dimensional object is printed. Thus, "applying individual particulate build material layers of polyamide particles to a powder bed" also includes spreading layers of particulate build material over the loose particles and fused layers beneath the new layer of polymer particles.

Definitions

It is noted that, as used in this specification and the appended claims, the singular forms "a," "an," and "the" include plural referents unless the context clearly dictates otherwise.

As used herein, "applying" when referring to fusing agent and/or detailing, for example, refers to any technology that can be used to put or place the respective fluid agent on or into a layer of particulate build material for forming three-dimensional objects. For example, "applying" may refer to "jetting." "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture, for example. Additionally, such architecture can be configured to print varying drop sizes such as from about 3 picoliters to less than about 10 picoliters, or to less than about 20 picoliters, or to less than about 30 picoliters, or to less than about 50 picoliters, etc.

As used herein, the term "substantial" or "substantially" when used in reference to a quantity or amount of a material, or a specific characteristic of a material, refers to an amount or property that is sufficient to provide an effect that the material or characteristic was intended to provide. The exact degree of deviation allowable may in some cases depend on the specific context. For example, when referring to "substantially devoid" of a compound that indicates that trace amounts may be present, but that amount would not be present at a great enough concentration to impact the performance of the material, e.g., less than about 0.1 wt %. Likewise, when referring to a geometry, the term "substantially" can be used to permit some small deviation, provided that deviation does not impact the performance.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein. Ranges that use the term "about" are supportive of providing this flexibility, but also support the numeric ranges provided as if the term "about" were removed. In other words, ranges with about include both the range flexibility provided by the term about and the slightly narrower numeric range interpreted be the numeric range without the term "about" included.

As used herein, a plurality of items, structural elements, compositional elements, and/or materials may be presented in a common list for convenience. However, these lists should be construed as though individual members of the list are individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

Example 1—Preparation of Particulate Build Materials

Six (6) different particulate build material compositions were prepared. More specifically, the particulate build materials prepared included PA11 or PA12 polymer particles having a D50 particle size of about 50 μm. One sample was 100 wt % PA11 (Control) and another sample was 100 wt % PA12 (Control). The same polyamide particles were also blended at 5 wt % with cubic boron nitride (BN) or 5 wt % of diamond-like carbon (DLC), each having a D50 particle size of about 1.5 μm. The six compositions are shown in Table 1 below:

TABLE 1

Particulate Build Materials

| Particulate Build Material ID | Polymeric Powder Content (50 μm) | BN or DLC Powder Content (1.5 μm) |
|---|---|---|
| PA11 (Control) | 100 wt % | — |
| PA11 BN | 95 wt % | 5 wt % BN |
| PA11 DLC | 95 wt % | 5 wt % DLC |
| PA12 (Control) | 100 wt % | — |
| PA12 BN | 95 wt % | 5 wt % BN |
| PA12 DLC | 95 wt % | 5 wt % DLC |

Example 2—Evaluation of Thermal Properties of Particulate Build Materials

To evaluate the thermal properties of polyamide-particle based particulate build materials of Table 1, heat capacity and thermal conductivity tests were conducted on the various particulate build materials. In some examples, a lower heat capacity and a higher thermal conductivity could provide a particulate build material that dissipates heat more quickly, and thus could be a more favorable material for three-dimensional printing at higher speeds with more precision.

Figure 5:
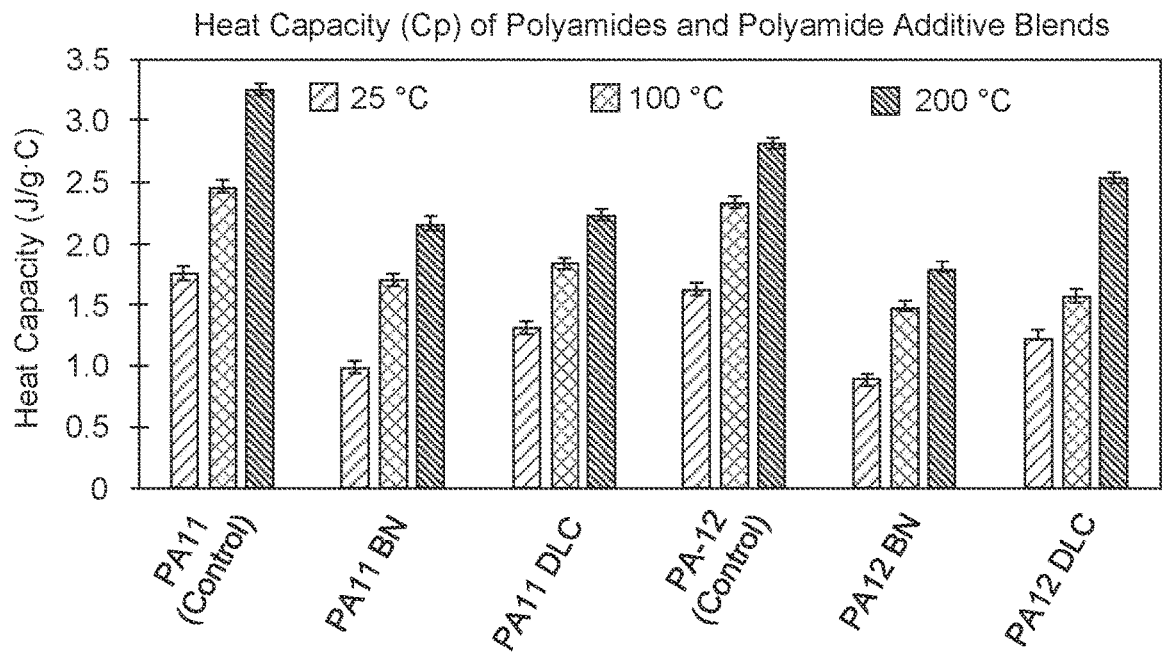
FIG. 5 illustrates example test results related to heat capacity of three-dimensional printed objects in accordance with the present disclosure.

As shown in FIG. 5, data was collected for constant pressure heat capacity (Cp) of the six (6) particulate build materials. Heat capacity measures the heat that can be retained by a material, which in this instance included the six different particulate build material samples. Heat capacity testing was carried out by differential scanning calorimetry (DSC). DSC is a thermal analysis technique which measures heat flow into or out of material as a function of temperature or time. As can be seen in FIG. 5, the inclusion of the cubic lattice structured particles, relative to its respective control, lowered heat capacity of the particulate build material at all three temperatures evaluated, e.g., 25° C., 100° C., and 200° C. It was found in this and other experiments that the lowering of the heat capacity was somewhat proportional to an increase of the additive.

Figure 6:
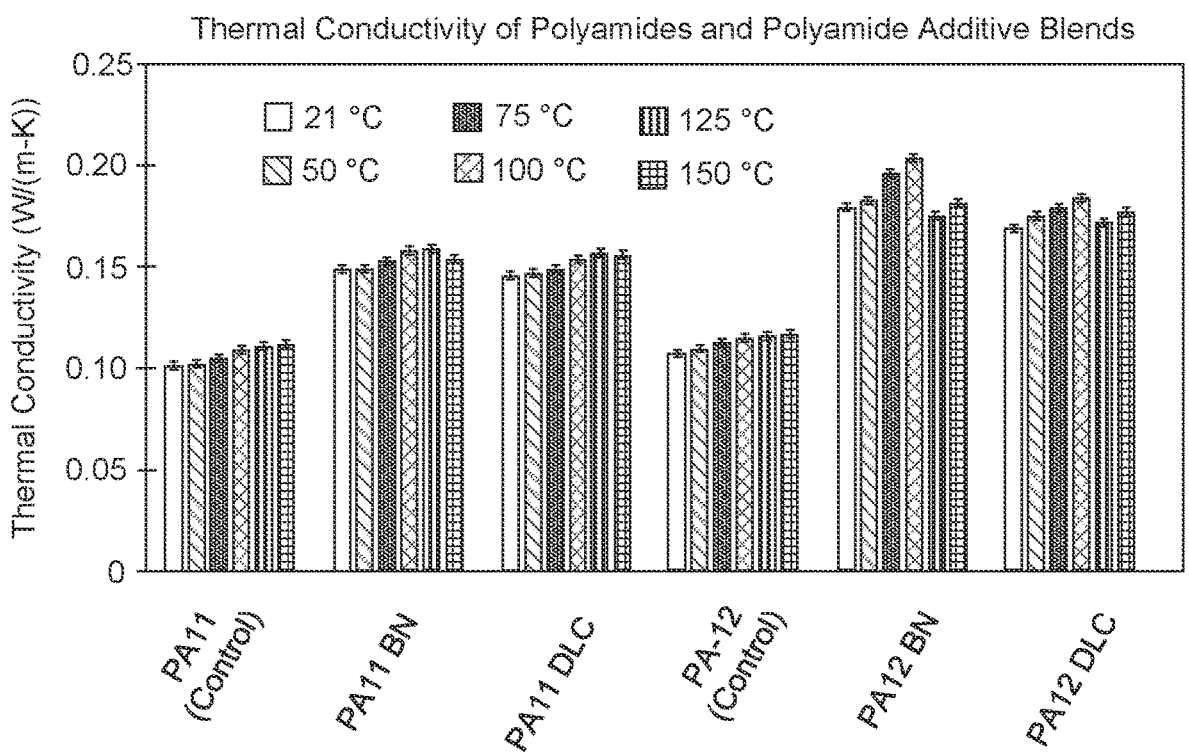
FIG. 6 illustrates example test results related to thermal conductivity of three-dimensional printed objects in accordance with the present disclosure.

As shown in FIG. 6, data was collected for thermal conductivity of the six (6) particulate build materials. Thermal conductivity measures the rate at which heat can pass through a material, which in this instance included the six different particulate build material samples. Thermal conductivity testing was carried out using a transient plane source (TPS) methodology. TPS thermal conductivity methodology utilizes a sensor element in the shape of a double spiral, which acts both as a heat source for increasing the temperature of a sample and a resistance thermometer for recording the time dependent temperature increase. As can be seen in FIG. 6, the inclusion of the cubic lattice structured particles, relative to its respective control, increased the thermal conductivity of the particulate build material at all six temperatures evaluated, e.g., 21° C., 50° C., 75° C., 100° C., 125° C., and 150° C. It was found in this and other experiments that the raising of the heat capacity was somewhat proportional to an increase of the additive.

Example 2—Preparation of Fusing Agent

To evaluate printed three-dimensional objects prepared using the particulate build materials of Table 1, a fusing agent was prepared in accordance with Table 2, as follows:

TABLE 2

| Fusing Agent | | |
| --- | --- | --- |
| Ingredient | Active (wt %) | Amount (wt %) |
| Carbon Black Pigment Dispersion | 12.8 | 5 |
| 2-Pyrrolidinone | 95 | 19 |
| Triethylene glycol | 100 | 8 |
| Surfactant | 100 | 1.2 |
| Biocide | 100 | 0.32 |
| Chelator | 100 | 0.08 |
| DI $H_2O$ | 100 | Balance |

Example 3—Preparation of Three-Dimensional Objects

Several three-dimensional printed objects were prepared in the shape of Type 5 dog bones (or dumbbell shapes described for the testing of tensile properties in ASTM D638, which establishes parameters for testing objects having a thickness ranging from about 1 mm to about 14 mm). The samples were prepared using the fusing agent prepared in accordance with Example 2 applied to various particulate build material samples using a Multi-jet Fusion (MJF) layer-by-layer printing process under common printing conditions, including printing bed temperature, layer thickness, fusing agent contone, and infrared energy parameters. Using this process, six (6) different varieties of example dog bones were prepared using the six particulate build material samples of Table 1, including a PA12 Control dogbone, a PA12 BN dogbone, a PA12 DLC dogbone, a PA11 Control dogbone, a PA11 BN dogbone, and a PA11 DLC dogbone. The dogbones prepared included an elongated middle section flanked by two enlarged end portions.

Example 4—Evaluation of Mechanical Properties

The dog bones prepared in accordance with Example 3 were evaluated for mechanical properties. Each of the six (6) particulate build materials were used to prepare several dog bones, and then the mechanical properties were averaged for each of the respective materials. More specifically, the various samples prepared were evaluated for the Young's Modulus and Strain (or elongation) at break and were measured using a tensile test following a standard procedure as described in ASTM D638. In addition, before carrying out the tensile testing protocol, all samples were pre-conditioned at 23° C. and 50% relative humidity for at least 24 hours after being built, and in these specific tests, a pull speed of 10 mm/min was applied and an extensometer was used to gauge the true strain of samples within the gauge length. The data collected for the eight dog bones, and the average values for the control dog bones and the example dog bones is provided in Table 3, as follows:

TABLE 3

| Mechanical Properties | | |
| --- | --- | --- |
| Sample ID | Average Young's Modulus (MPa) | Average Strain at Break (%) |
| PA12 Control Dogbone | 1357 | 52 |
| PA12 BN Dogbone | 1342 | 50 |
| PA12 DLC Dogbone | 1348 | 53 |
| PA11 Dogbone | 1845 | 49 |
| PA11 BN Dogbone | 1826 | 51 |
| PA11 DLC Dogbone | 1852 | 51 |

As can be seen in Table 3, the addition of the cubic boron nitride or the diamond-like carbon did not have an appreciable impact on mechanical properties, even though these materials exhibited significantly lower heat capacity and higher thermal conductivity. Thus, in some examples, cubic boron nitride and or diamond-like carbon can be added to modify the thermal properties of the three-dimensional objects being prepared without significant impact on modulus and strain at break parameters. Through this and other testing, it was found that the mechanical properties could be retained by adding one or a combination of both of these types of additives, e.g., cubic boron nitride and/or diamond-like carbon, up to about 7.5 wt % of the additive.

What is claimed is:
1. A particulate build material for three-dimensional printing, comprising:
from about 80 wt % to about 99.5 wt % of a polyamide particles; and from about 0.5 w % to about 7.5 wt % of thermally conductive particles including cubic lattice structured particles of carbon, cubic lattice structured particles of boron and nitrogen, or a combination thereof.

2. The particulate build material of claim 1, wherein the thermally conductive particles include cubic boron nitride particles, amorphous boron nitride particles, or a combination thereof.

3. The particulate build material of claim 1, wherein the thermally conductive particles include diamond particles, diamond-like carbon particles, or a combination thereof.

4. The particulate build material of claim 1, wherein the polyamide particles have an aspect ratio of about 1:1 to about 2:1 and a D50 particle size from about 5 μm to about 150 μm.

5. The particulate build material of claim 1, wherein the thermally conductive particles have an aspect ratio of about 1:1 to about 2:1 and a D50 particle size from about 30 nm to about 10 μm.

6. The particulate build material of claim 1, wherein the melting point temperature of the polyamide particles is from about 100° C. to about 350° C.

7. The particulate build material of claim 1, wherein the polyamide particles comprise polyamide-6, polyamide-8, polyamide-10, polyamide-11, polyamide-12, polyamide-6,6, polyamide 6,10, polyamide-6,12, thermoplastic polyamide elastomer, polyamide copolymer, or a combination thereof.

8. The particulate build material of claim 1, wherein the particulate build material consists essentially of the polyamide particles and the thermally conductive particles.

9. A three-dimensional printing system, comprising:
a particulate build material including from about 80 wt % to about 99.5 wt % of a polyamide particles and from about 0.5 w % to about 7.5 wt % of thermally conductive particles including cubic lattice structured particles of carbon, cubic lattice structured particles of boron and nitrogen, or a combination thereof; and
a fusing agent to selectively apply to the particulate build material, wherein the fusing agent comprises water and a radiation absorber to absorb radiation energy and convert the radiation energy to heat.

10. The three-dimensional printing system of claim 9, wherein the radiation absorber is carbon black pigment, glass fiber, titanium dioxide, clay, mica, talc, barium sulfate, calcium carbonate, metal dithiolene complex, near-infrared absorbing dye, near-infrared absorbing pigment, metal nanoparticles, conjugated polymer, or a combination thereof.

11. The three-dimensional printing system of claim 9, further comprising a detailing agent comprising a detailing compound, wherein the detailing compound reduces the temperature of particulate build material onto which the detailing agent is applied.

12. The three-dimensional printing system of claim 9, further comprising a radiant energy source positioned to expose a layer of particulate build material to radiation energy to selectively fuse the polyamide particles that have been contacted with the radiation absorber.

13. A method of printing a three-dimensional object comprising:
iteratively applying individual layers of a particulate build material to a powder bed, wherein the particulate build material comprises from about 80 wt % to about 99.5 wt % of a polyamide particles and from about 0.5 w % to about 7.5 wt % of thermally conductive particles including cubic lattice structured particles of carbon, cubic lattice structured particles of boron and nitrogen, or a combination thereof;
based on a three-dimensional object model, selectively applying a fusing agent onto the individual layers of particulate build material, wherein the fusing agent comprises water and a radiation absorber, wherein the radiation absorber absorbs radiation energy and converts the radiation energy to heat; and
exposing the powder bed to radiation energy to selectively fuse the polyamide particles in contact with the radiation absorber at individual layers to iteratively form the three-dimensional object with the thermally conductive particles dispersed therein.

14. The method of claim 13, wherein the thermally conductive particles include cubic boron nitride particles, amorphous boron nitride particles, diamond particles, diamond-like carbon particles, or a combination thereof; and wherein the thermally conductive particles have an aspect ratio of about 1:1 to about 1:2 and a D50 particle size from about 30 nm to about 10 μm.

15. The method of claim 13, wherein the particulate build material consists essentially of the polyamide particles and the thermally conductive particles.

\* \* \* \* \*